(12) United States Patent
Zhang et al.

(10) Patent No.: US 6,616,865 B1
(45) Date of Patent: *Sep. 9, 2003

(54) STERICALLY STABILIZED SECOND-ORDER NONLINEAR OPTICAL CHROMOPHORES WITH IMPROVED STABILITY AND DEVICES INCORPORATING THE SAME

(75) Inventors: Cheng Zhang, Los Angeles, CA (US); Harold R. Fetterman, Pacific Palisades, CA (US); William Steier, San Marino, CA (US); Joseph Michael, Los Angeles, CA (US)

(73) Assignee: Pacific Wave Industries, Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/546,930

(22) Filed: Apr. 11, 2000

Related U.S. Application Data

(63) Continuation-in-part of application No. 09/488,422, filed on Jan. 20, 2000, now Pat. No. 6,361,717, and a continuation-in-part of application No. 09/122,806, filed on Jul. 27, 1998, now Pat. No. 6,067,186.

(51) Int. Cl.[7] .............................. F21V 9/00; G02F 1/35
(52) U.S. Cl. ........................................ 252/582; 359/328
(58) Field of Search ........................... 252/582; 359/328

(56) References Cited

U.S. PATENT DOCUMENTS

| | | | |
|---|---|---|---|
| 3,821,182 A | 6/1974 | Baird, Jr. et al. | 260/91.7 |
| 3,879,330 A | 4/1975 | Lustig | 260/31.8 |
| 3,932,693 A | 1/1976 | Shaw et al. | 428/518 |
| 4,048,428 A | 9/1977 | Baird, Jr. et al. | 526/343 |
| 4,064,296 A | 12/1977 | Bornstein et al. | 428/35 |
| 4,284,671 A | 8/1981 | Cancio et al. | 428/35 |
| 4,837,293 A | 6/1989 | Silvis et al. | 528/99 |

(List continued on next page.)

OTHER PUBLICATIONS

D. G. Girton, et al., "20 GHz electro–optic polymer Mach–Zehnder modulator", *Applied Physics Letters*, vol. 58, No. 16, pp. 1730–1732 (1991).

(List continued on next page.)

*Primary Examiner*—Philip Tucker
(74) *Attorney, Agent, or Firm*—Henricks, Slavin & Holmes LLP

(57) ABSTRACT

Sterically stabilized second-order nonlinear optical chromophores and devices incorporating the same are embodied in a variety of chromophore materials. An exemplary preferred chromophore includes an electron donor group, an electron acceptor group and a ring-locked bridge structure therebetween, with the bridge structure being directly connected to the electron donor via a single bond. Another exemplary preferred chromophore includes an electron donor group, an electron acceptor group and a ring-locked bridge structure between the electron donor group and the electron acceptor group, with two free double bonds, one located between the donor and the bridge and the other located between the (fused) ring bridge and the acceptor. Another exemplary preferred chromophore includes an electron donor group, an electron acceptor group, and a bridge structure therebetween, with the chromophores having no carbon-carbon double bond between the donor and the (fused) ring bridge. In this class, there is only one unlocked carbon-carbon double bond between the (fused) ring bridge and the acceptor. Another exemplary preferred chromophore includes an electron donor group, an electron acceptor group, and a ring-locked bridge structure therebetween, with a built-in electron-withdrawing cyano group on the last ring of the (fused) bridge. Another exemplary preferred chromophore includes any electron donor group, an electron acceptor group including a linear conjugated triene bearing four cyano groups, and any bridge structure therebetween.

26 Claims, 17 Drawing Sheets

(IIa)

(IIb)

(IIc)

U.S. PATENT DOCUMENTS

| | | | |
|---|---|---|---|
| 4,914,138 A | 4/1990 | Percec et al. .................. | 525/71 |
| 4,945,134 A | 7/1990 | Wallace et al. .............. | 525/301 |
| 5,017,411 A | 5/1991 | Chen-Tsai et al. ......... | 428/36.6 |
| 5,039,751 A | 8/1991 | Wallace et al. .............. | 525/301 |
| 5,079,321 A | 1/1992 | Sperling et al. ............ | 526/311 |
| 5,093,466 A | 3/1992 | Patton et al. ............... | 528/343 |
| 5,196,147 A | 3/1993 | Taketani et al. ............ | 252/589 |
| 5,223,603 A | 6/1993 | Patton et al. ............... | 528/343 |
| 5,233,461 A * | 8/1993 | Dornan et al. .............. | 359/328 |
| 5,290,630 A | 3/1994 | Devonald et al. ........... | 428/333 |
| 5,315,432 A * | 5/1994 | Ohno ......................... | 359/326 |
| 5,370,937 A | 12/1994 | Lee et al. .................... | 428/448 |
| 5,432,286 A | 7/1995 | Cabrera et al. ............. | 546/270 |
| 5,436,920 A * | 7/1995 | Minemoto et al. ............ | 372/21 |
| 5,440,446 A | 8/1995 | Shaw et al. .............. | 361/301.5 |
| 5,500,302 A | 3/1996 | Phillips et al. ........... | 428/474.4 |
| 5,514,799 A | 5/1996 | Varanasi et al. ............ | 544/300 |
| 5,535,048 A | 7/1996 | Mignani et al. ............ | 359/326 |
| 5,549,853 A | 8/1996 | Beckmann et al. ......... | 252/582 |
| 5,609,555 A | 3/1997 | Lee et al. .................... | 493/210 |
| 5,637,365 A | 6/1997 | Carlblom .................... | 428/354 |
| 5,663,308 A | 9/1997 | Gibbons et al. ............ | 534/573 |
| 5,670,603 A | 9/1997 | Wu et al. .................... | 528/190 |
| 5,676,884 A | 10/1997 | Tiers et al. ................. | 252/582 |
| 5,679,763 A | 10/1997 | Jen et al. ..................... | 528/403 |
| 5,686,126 A | 11/1997 | Noel et al. .................. | 426/127 |
| 5,688,906 A | 11/1997 | Jen et al. ..................... | 528/353 |
| 5,697,744 A | 12/1997 | Medal ......................... | 411/82 |
| 5,698,134 A | 12/1997 | Jubb et al. ............. | 252/299.01 |
| 5,707,691 A | 1/1998 | Plester et al. ............... | 427/472 |
| 5,714,304 A | 2/1998 | Gibbons et al. ....... | 430/270.11 |
| 5,718,845 A | 2/1998 | Drost et al. ................. | 252/582 |
| 5,725,909 A | 3/1998 | Shaw et al. .............. | 427/412.1 |
| 5,738,806 A | 4/1998 | Beckmann et al. ......... | 252/582 |
| 5,783,306 A | 7/1998 | Therien et al. .......... | 428/411.1 |
| 5,804,101 A | 9/1998 | Marder et al. .............. | 252/582 |
| 5,846,638 A | 12/1998 | Meissnet ..................... | 428/220 |
| 5,854,866 A | 12/1998 | Leonard ...................... | 385/39 |
| 5,882,785 A | 3/1999 | Hollins et al. .............. | 428/333 |
| 5,883,259 A | 3/1999 | Kim et al. ................... | 548/224 |
| 5,885,672 A | 3/1999 | Phillips et al. ............. | 428/35.2 |
| 5,887,116 A | 3/1999 | Grote ............................ | 385/2 |
| 5,889,131 A | 3/1999 | Kim et al. ................... | 526/262 |
| 5,892,859 A | 4/1999 | Grote ............................ | 385/2 |
| 6,002,697 A * | 12/1999 | Govorkov et al. ............. | 372/34 |
| 6,348,992 B1 * | 2/2002 | Zhang ......................... | 252/582 |
| 6,361,717 B1 * | 3/2002 | Dalton ........................ | 252/582 |

OTHER PUBLICATIONS

D. M. Burland, et al., "Second–Order Nonlinearity in Poled–Polymer Systems", *Chemical Reviews*, vol. 94, pp. 31–75 (1994).

S. Kalluri, "Improved poling and thermal stability of sol–gel nonlinear optical polymers", *Applied Physics Letters*, vol. 65, No. 21, pp. 2651–2653 (1994).

I. Cabrere, et al., "A New Class of Planar–Locked Polyene Dyes for Nonlinear Optics", *Advanced Materials*, vol. 6, pp. 43–45 (1994).

W. Wang, "40–GHz Polymer Electrooptic Phase Modulators", *IEEE Photonics Technology Letters*, vol. 7, No. 6, pp. 638–640 (1995).

L. R. Dalton, et al., "Synthesis and Processing of Improved Organic Second–Order Nonlinear Optical Materials for Applications in Photonics", *Chemistry of Materials*, vol. 7, pp. 1060–1081 (1995).

S. Kalluri, "Monolithic Integration of Waveguide Polymer Electrooptic Modulators on VLSI Circuitry", *IEEE Photonics Technology Letters*, vol. 8, No. 5, pp. 644–646 (1996).

Y. Shi, et al., "Fabrication and Characterization of High–Speed Polyurethane–Disperse Red 19 Integrated Electrooptic Modulators for Analog System Applications", *IEEE Journal of Selected Topics in Quantum Electronics*, vol. 2, No. 2, pp. 289–299 (1996).

C. Shu, et al., "Synthesis of second–order nonlinear optical chromophores with enhanced thermal stability: a conformation–locked trans–polyene approach", *Chemical Communication*, pp. 2279–2280 (1996).

A. Chen, "Optimized Oxygen Plasma Etching of Polyurethane–Based Electro–optic Polymer for Low Loss Optical Waveguide Fabrication", *Journal of Electrochemical Society*, vol. 143, No. 11, pp. 3648–3651 (1996).

D. X. Zhu, "Noncollinear four–wave mixing in a broad area semiconductor optical amplifier", *Applied Physics Letters*, vol. 70, No. 16, pp. 2082–2084 (1997).

D. Chen, "Demonstration of 110GHz eletro–optic polymer modulators", *Applied Physics Letters*, vol. 70, No. 25, pp. 3335–3337 (1997).

L. Dalton, "Polymeric electro–optic modulators", *Chemistry & Industry*, pp. 510–514 (1997).

S. Ermer, "Synthesis and Nonlinearity of Triene Chromophores Containing the Cyclohexen Ring Structure", *Chemistry of Materials*, vol 9, pp. 1437–1442 (1997).

A. Harper, et al., "Translating microscopic optical nonlinearity into macroscopic optical nonlinearity: the role of chromophore–chromophore electrostatic interactions", *Journal of Optical Society of America: B*, Vol. 15, No. 1, pp. 329–337 (1998).

A. Chen, et al., "Low–$V_\pi$ electro–optic modular with a high–$\mu\beta$ chromophore and a constant–bias field", *Optics Letters*, vol. 23, No. 6, pp. 478–480 (1998).

C. Shu, et al., Nonlinear Optical Chromophores with Configuration–Locked Polyenes Possessing Enhanced Thermal Stability and Chemical Stability, *Chemistry of Materials*, vol. 10, pp. 3284–3286 (1998).

L. R. Dalton et al., "From molecules to opto–chips: organic electro–optic materials," *J. Mater. Chem.*, 1999, 9, 1905–1920.

L. R. Dalton, "Polymeric electro–optic materials: optimization of electro–optic activity, minimization of optical loss, and fine–tuning of device performance," *Opt. Eng.* 39(3) 589–595 (Mar. 2000).

T. M. Londergan et al., "Dendrimer Functionalized NLO Chromophores," *Polymer Preprints* 2000, 41(1), 783–784.

H. Ma et al., "A Novel Class of High–Performance Prfluorocyclobutate–Containing Polymers for Second–Order Nonlinear Optics," *Chem. Mater.* 2000, 12, 1187–1189 (Published on Web Apr. 7, 2000).

N. Nemoto et al., "Novel Types of Polyesters Containing Second–Order Nonlinear Optically Active Chromophores with High Density," *Macromolecules* 1996, 29, 2365–2371.

Z. Sekkat et al., "Room–Temperature Photoinduced Poling and Thermal Poling of a Rigid Main–Chain Polymer with Polar Azo Dyes in the Side Chain," *Chem. Mater.* 1995, 7, 142–147.

S. Yokoyama et al., "Second harmonic generation of dipolar dendrons in the assembled thin films," *Thin Solid Films* 331 (1998) 248–253.

S. Yokoyama et al., "Intermolecular Coupling Enhancement of the Molecular Hyperpolarizability in Multichromophoric Dipolar Dendrons," *J. Am. Chem. Soc.* 2000, 122(13), 3174–3181 (Published on Web Mar. 11, 2000).

C. Zhang et al., "Chromophore Incorporating Fluorinated Aromatic Polyester for Electro–optic Applications," *Polymer Preprints* 40(2) Aug. 1999.

Y. Zhang et al., "A new hyperbranched polymer with polar chromophores for nonlinear optics," *Polymer* (1997), 38(12), 2893–2897.

* cited by examiner (Ia)

(Ib)

(Ic)

(IIa)

(IIb)

(IIc)

(IIIa)

(IIIb)

(IIIc)

(IIId)

(IVa)

(IVb)

(IVc)

(IVd)

D = VARIOUS DONOR GROUPS, INCLUDING, BUT NOT LIMITED TO, DONORS SHOWN IN FIG. 6,

, OR ns a diene moiety in place of thiophene in the conventional phenylethenylenethiophene π-conjugated bridge.
STERICALLY STABILIZED SECOND-ORDER NONLINEAR OPTICAL CHROMOPHORES WITH IMPROVED STABILITY AND DEVICES INCORPORATING THE SAME

CROSS-REFERENCE TO RELATED APPLICATIONS

This application is a continuation-in-part of U.S. patent application Ser. No. 09/122,806 entitled "New Class of High Hyperpolarizability Organic Chromophores and Process for Synthesizing the Same" filed on Jul. 27, 1998, now U.S. Pat. No. 6,067,186, and a continuation-in-part of U.S. patent application Ser. No. 09/488,422 entitled "Sterically Stabilized Second-Order Nonlinear Optical Chromophores and Devices Incorporating the Same" filed on Jan. 20, 2000, now U.S. Pat. No. 6,361,717, the disclosures of which are incorporated herein by reference in their entirety.

STATEMENT REGARDING FEDERALLY SPONSORED RESEARCH AND DEVELOPMENT

This invention was made with support from the government of the United States of America under Contracts F49620-97-C-0064, F49620-97-1-0307, F49620-97-1-0491, F49620-98-C-0059, F49620-98-C-0077, F49620-99-0040 awarded by the United States Air Force. The government of the United States of America has certain rights in this invention as provided by these contracts.

BACKGROUND OF THE INVENTION

1. Field of the Invention

The present invention relates to nonlinear optical chromophores and, more particularly, pertains to highly active second-order nonlinear optical chromophores with reduced degree of trans-cis isomerization and devices incorporating the same.

2. Description of the Related Art

Organic second-order nonlinear optical (NLO) materials have received increasing attention for applications involving signal processing and telecommunications. One of the challenges in this field is to design and synthesize second-order NLO chromophores (the active components of second-order nonlinear optical materials) that simultaneously possess large first molecular hyperpolarizabilities ($\beta$), good chemical, thermal and photochemical stability, and optical transparency at optical communication wavelengths (1.3 and 1.55 $\mu$m). Chromophore intermolecular electrostatic interactions prevent the simple scaling of molecular optical nonlinearity into macroscopic optical nonlinearity. Such interactions strongly attenuate the efficient induction of acentric chromophore order (hence, electrooptic activity) by electric field poling or self-assembly methods. Chromophores with $\beta$ values many times those of the well-known Disperse Red 19 dye are thus required to obtain electrooptic coefficients comparable to or higher than those of the leading commercial material crystalline lithium niobate.

The value of $\beta$ for a chromophore can be increased by using a diene moiety in place of thiophene in the conventional phenylethenylenethiophene π-conjugated bridge. Moreover, this enhancement in $\beta$ can be accomplished without an increase in the wavelength of the charge-transfer absorption $\lambda_{max}$. However, the resulting phenylpolyene bridge has poor thermal stability unless the polyene structure is sterically protected (ring locked).

In addition to microscopic and macroscopic nonlinearity, the chemical stability and alignment stability of second-order NLO material are also major problems which must be solved for successful employment of these materials in commercial devices. Chemical degradation of the material are caused by photoinduced chemical reaction and thermal decompostition. In oxygen-containing environment (e.g. air) photoinduced oxidation of chromophore is the major cause of chromophore degradation. Photoxoidation changes the chromophore to a new species that is effectively electrooptically inactive.

Orientational relaxation is also a major problem. The loss of chromophore dipole alignment is caused by photoinduced or thermally-induced structural isomerization, thermodynamic randomization and interchromophore electrostatic interaction, which favor a centrosymmetric antiparallel arrangement of dipoles. The dominant mechanism of photodegradation of chromophores in an oxygen containing environment is photo-oxidation by oxygen.

Properties (microscopic nonlinearity, macroscopic, chemical and thermal stability, etc) of second-order nonlinear optical material are inter-related. Optimization of one property often causes attenuation in other properties. A systematic approach to addressing both the stability and nonlinearity issues is needed for a balanced improvement of both properties.

SUMMARY OF THE INVENTION

The nonlinear optical devices and chromophores of the present invention address both the stability and nonlinearity issues, and embody a systematic approach to obtaining a balanced improvement of both properties.

According to exemplary preferred embodiments of the present invention, a solution to the dipole stability problem is to modify the chromophore structure to reduce the amount of (or completely eliminate) the structural units that are potential sources of randomization and to add some structure feature that reduces interchromophore dipole interaction.

The present invention provides for improvements in the chemical and alignment stabilities of polyene-bridged chromophores. It has been observed that polyene-bridge systems that contain free carbon-carbon double bonds can undergo trans-cis isomerization under radiation of light or when subjected to elevated temperatures. The trans-cis isomerization leads to low chemical stability (low decomposition temperature) and causes randomization of chromophore noncentrosymmetric alignment. According to the present invention, reducing the amount of freely isomerizing double bonds in bridge structures provides an effective way to enhance both the chemical stability and the alignment stability of electrooptic materials.

It has been observed, by studying the photochemical stability of highly active (high $\mu\beta$) chromophores in inert atmospheres, that the removal of oxygen greatly enhances the photochemical stability of electrooptic (EO) materials and the complete elimination of oxygen from the device and the atmosphere is a solution to the problem of oxygen-related photochemical degradation. According to an exemplary preferred embodiment of the present invention, an electrooptic device is hermetically packaged in a container filled with inert gas.

A variety of different molecular structures are possible for the chromophores of the present invention. An exemplary preferred class of chromophores according to the present invention includes an electron donor group, an electron acceptor group and a ring-locked bridge structure therebetween, with the bridge structure being directly connected to the electron donor via a single bond. In this class of chromophores, there are two carbon-carbon double bonds that can undergo trans-cis isomerization. In a preferred embodiment, the bridge structure also includes at least one bulky side group to reduce interchromophore dipole interaction.

Another exemplary preferred class of chromophores according to the present invention includes an electron donor group, an electron acceptor group and a ring-locked bridge structure between the electron donor group and the electron acceptor group, with two free double bonds, one located between the donor and the bridge and the other located between the (fused) ring bridge and the acceptor. In a preferred embodiment, the bridge structure also includes at least one bulky side group.

Another exemplary preferred class of chromophores according to the present invention includes an electron donor group, an electron acceptor group, and a bridge structure therebetween, with the chromophores having no carbon-carbon double bond between the donor and the (fused) ring bridge. In this class, there is only one unlocked carbon-carbon double bond between the (fused) ring bridge and the acceptor. In a preferred embodiment, the bridge structure also includes at least one bulky side group.

Another exemplary preferred class of chromophores according to the present invention includes an electron donor group, an electron acceptor group, and a ring-locked bridge structure therebetween, with a built-in electron-withdrawing cyano group on the last ring of the (fused) bridge. In a preferred embodiment, the bridge structure also includes at least one bulky side group.

Another exemplary preferred class of chromophores according to the present invention include any electron donor group, an electron acceptor group including a linear conjugated triene bearing four cyano groups (e.g., new electron acceptor group 4CF or 4CI disclosed herein), and any bridge structure therebetween.

The NLO materials of the present invention are suitable for a wide range of devices. Functions performed by these devices include, but are not limited to, the following: electrical to optical signal transduction; radio wave to millimeter wave electromagnetic radiation (signal) detection; radio wave to millimeter wave signal generation (broadcasting); optical and millimeter wave beam steering; and signal processing such as analog to digital conversion, ultrafast switching of signals at nodes of optical networks, and highly precise phase control of optical and millimeter wave signals. These materials are suitable for arrays which can be used for optical controlled phased array radars and large steerable antenna systems as well as for electrooptical oscillators which can be used at high frequencies with high spectral purity.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Figure 1:
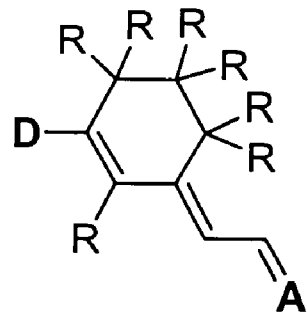
FIG. 1 illustrates the basic structure of class I chromophores according to the present invention.
Figure 1:
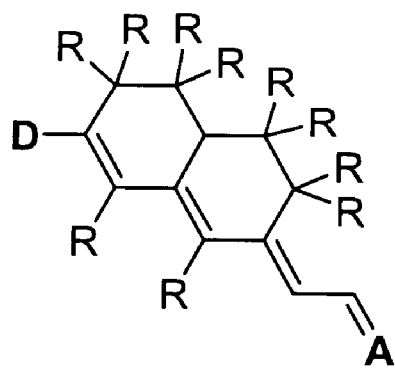
Figure 1:
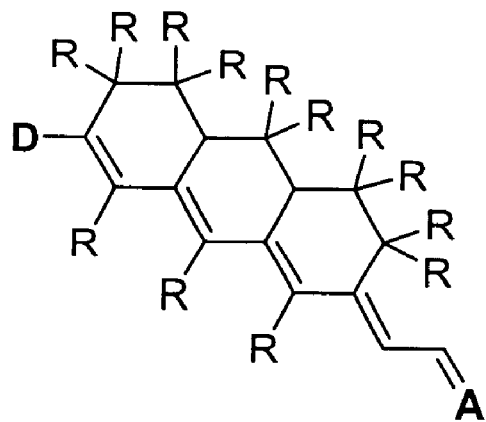
Figure 6:
FIG. 6 illustrates some representative electron donors used according to the present invention for synthesizing all the chromophores.
Figure 6:
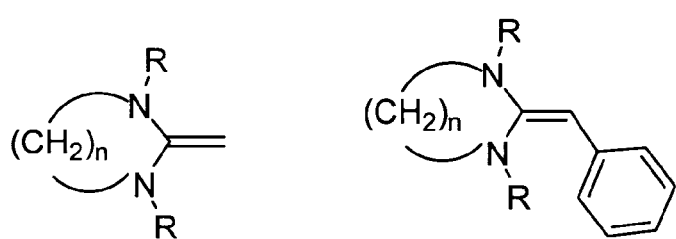
Figure 7:
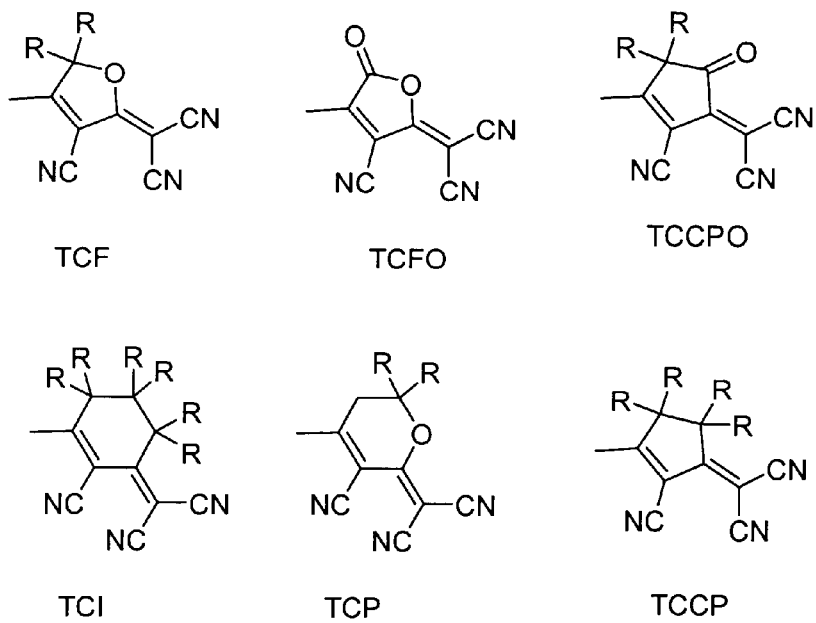
FIG. 7 illustrates ring-locked tricyano electron acceptors used for construction of some of the chromophores in the present invention.
Figure 8:
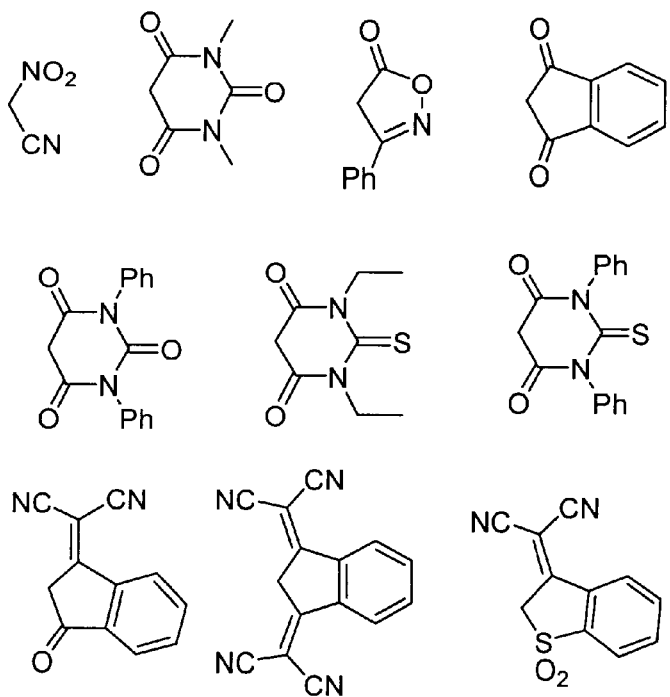
FIG. 8 illustrates some representative electron acceptors used for construction of some of the chromophores in the present invention.

Referring to FIG. 1, three chromophore structures (Ia, Ib, and Ic) according to the present invention are illustrated. Each chromophore includes an electron donor group ("D"), an electron acceptor group ("A") and a bridge structure therebetween. According to the present invention, these chromophores include an electron donor group which is directly connected to a (fused) ring-locked π-conjugate bridge; the chromophore structures have no free double bond between the donor D the (fused) ring bridge. In this class, there is a conjugated diene between the (fused) ring bridge and the acceptor. Various electron donors can be used, including, but not limited to, aminobenzenes, aminothiophenes, and ketene aminals (shown in FIG. 6). The electron acceptors can be any electron acceptor bearing an acidic methyl or methylene group, including, but not limited to, the acceptors shown in FIGS. 5, 7 and 8. In structures Ia, Ib, and Ic, R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy. The R groups at different positions are not necessarily the same.

Synthesis of Chromophores of Structures Ia, Ib, or Ic

For an exemplary synthesis of chromophores of the structure Ia in FIG. 1, See, C. Zhang, A. S. Ren, F. Wang, J. Zhu, L. Dalton, "Synthesis and Characterization of Sterically Stabilized Second-Order Nonlinear Optical Chromophores", Chem. Mater. 1999, 11, 1966–1968, which is incorporated herein by reference.

Figure 9:
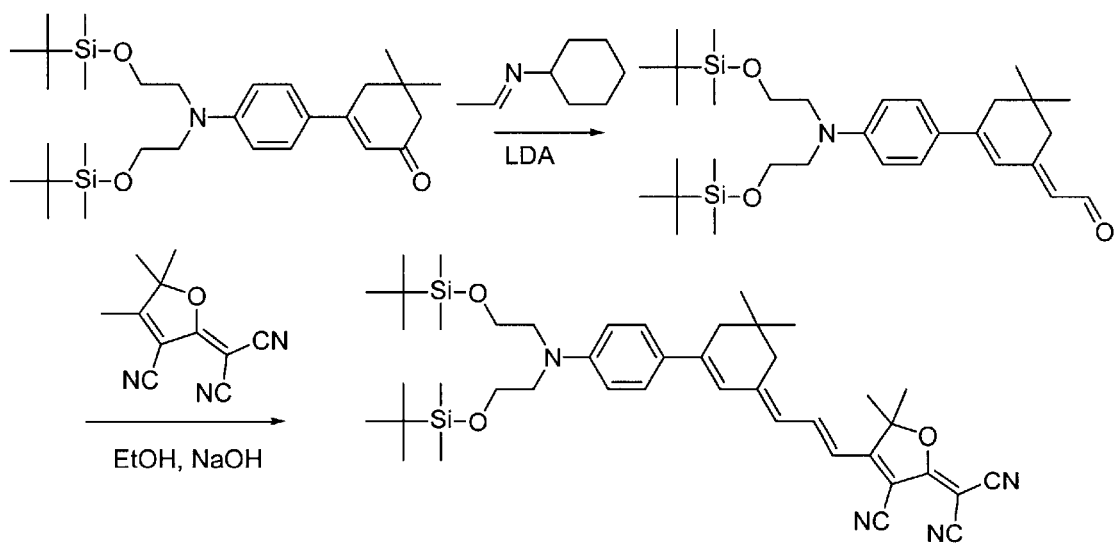
FIG. 9 illustrates an exemplary synthetic scheme of the single-ring bridged chromophore shown in FIG. 1.

An alternative synthetic scheme of chromophores of structure Ia is shown in FIG. 9. The synthesis of the starting material 1-(4-bis(2-t-butyldimethylsiloxyethyl) aminophenyl)-5,5-dimethylcyclohexen-3-one is described in C. Zhang, A. S. Ren, F. Wang, J. Zhu, L. Dalton, Chem. Mater. 1999, 11, 1966–1968.

Step 1. conjugate elongation of ketone: A solution of lithium diisopropylamide (4.7 mL 1.5M in THF, 7.05 mmol.) in THF (12 mL) was cooled to −20° C. N-cyclohexylacetimine (6.7 mmol.) was added and the mixture was allowed to warm up to 0° C. and was kept at the temperature for 15 min. It was re-cooled to −20° C. and 1-(4-bis(2-t-butyldimethylsiloxyethyl)aminophenyl)-5,5-dimethylcyclohexen-3-one (6.71 mmol., in 15 mL of THF) was added over 3 min. The mixture was stirred for 5 more min. and was stopped by adding 1N acetic acid solution. The product was extracted with hexane and the extract was washed with sodium bicarbonate solution, dried with magnesium sulfate and condensed to dryness. The residue was purified by a silica gel column using ethyl acetate/hexane (1/20, v/v) to afford 74% yield of product.

Step 2: The above aldehyde product (2 mmol.) and 2-dicyanomethylene-3-cyano-4,5,5-trimethyl-2,5-dihydrofuran (2.1 mmol.) were dissolved in 10 mL of ethanol that contained 15 mg of sodium hydroxide. The solution was refluxed for 3h. After the reaction mixture was cooled down, the product precipitate was collected by filtration. The crude product was recrystallized from ethanol to give 55% yield of chromophore.

Figure 10:
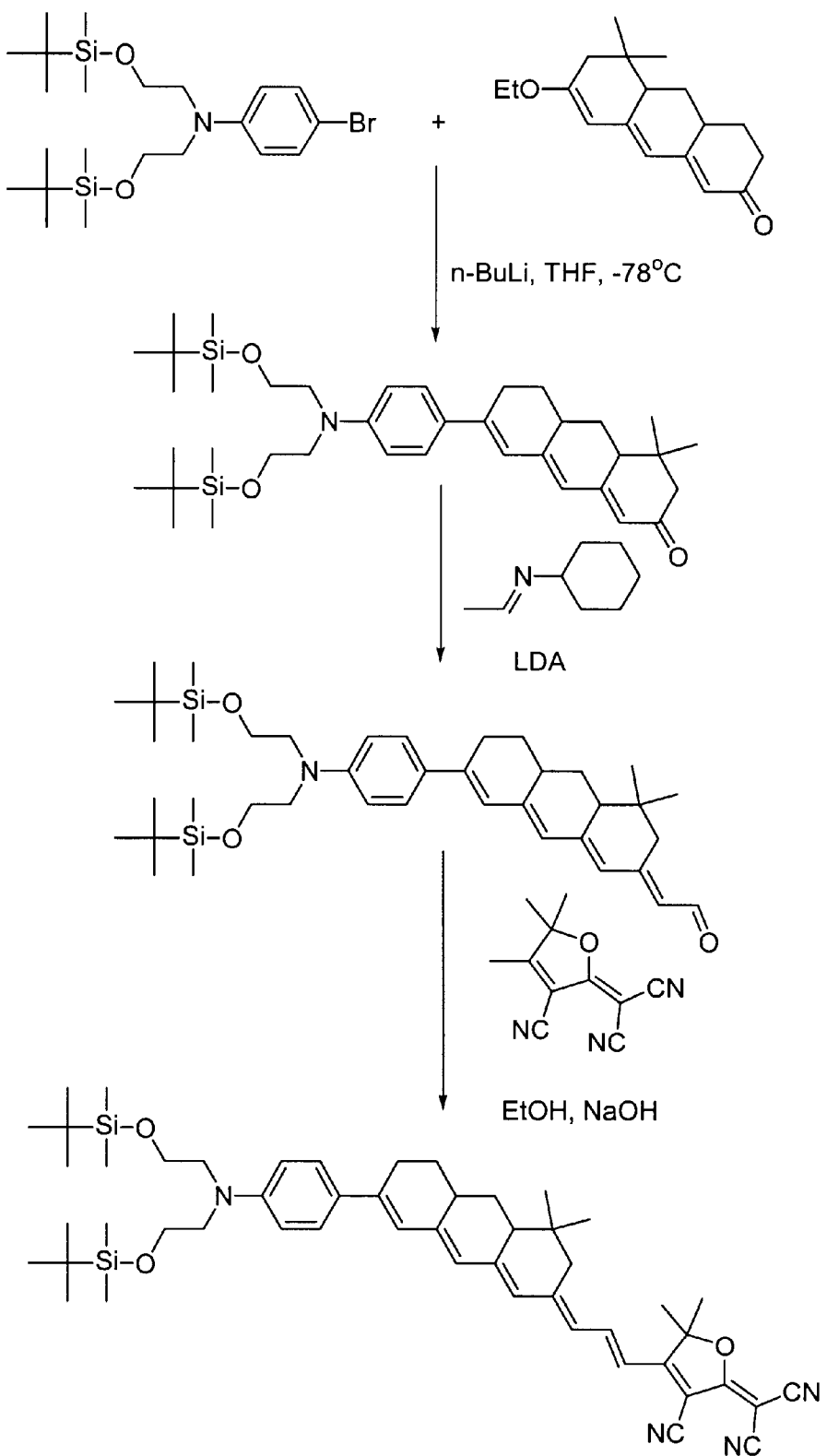
FIG. 10 illustrates an exemplary synthetic scheme of the fused triple-ring bridged chromophore shown in FIG. 1.

Referring to FIG. 10, an exemplary preferred synthetic scheme of a chromophore with structure Ic in FIG. 1 is shown. The synthesis of the starting material (N,N-bis(2-t-butyldiinethylsiloxyethyl)-4-bromoaniline is described in C. Zhang, A. S. Ren, F. Wang, J. Zhu, L. Dalton, Chem. Mater. 1999, 11, 1966–1968. The synthesis of the fused triple-ring starting material has been described in and synthesized according C.-F. Shu et al, Chem. Mater. 1998, 10, 3284.

Step 1. Follow the reaction procedure described for a similar reaction in C. Zhang, A. S. Ren, F. Wang, J. Zhu, L. Dalton, Chem. Mater. 1999, 11, 1966–1968.

Step 2. Conjugate elongation of ketone: A solution of lithium diisopropylamide (10.5 mmol.) in THF (16 mL) was cooled to −20° C. N-cyclohexylacetimine (10 mmol.) was added and the mixture was allowed to warm up to 0° C. and was kept at the temperature for 15 min. It was re-cooled to −20° C. and the product enone of step 1 (10 mmol in 20 mL of THF) was added over 5 min. The mixture was stirred for 5 more min. and was stopped by adding 1N acetic acid solution. The product was extracted with hexane and the extract was washed with sodium bicarbonate solution, dried with magnesium sulfate and condensed to dryness. The residue was purified by column chromatography on silica gel to afford 65% yield of product.

Figure 11:
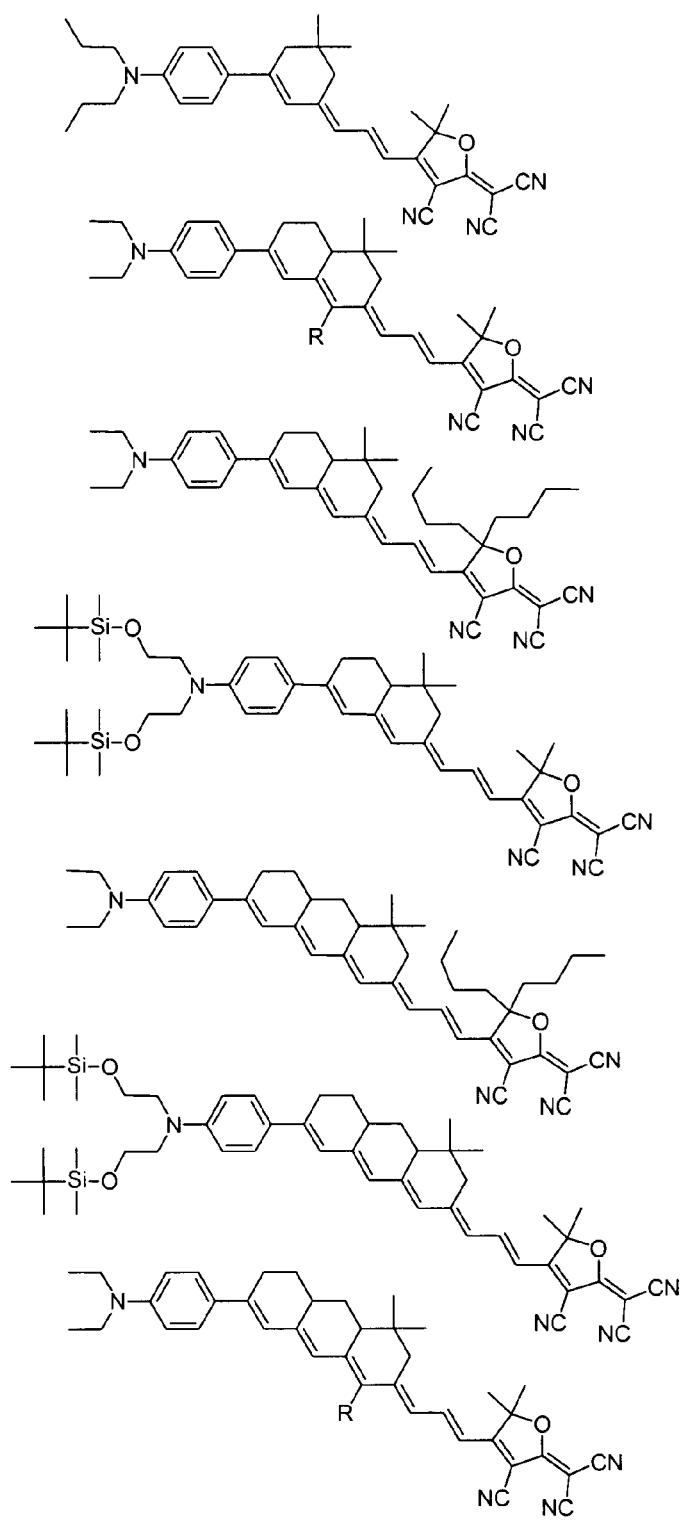
FIG. 11 illustrates some exemplary preferred chromophores having the basic structures depicted in FIG. 1.

A large number of variations of the structures depicted in FIG. 1 have been synthesized, characterized, and utilized in the fabrication of prototype devices by modifying the starting materials in the general synthetic schemes presented herein. Exemplary preferred CLD chromophores synthesized according to the present invention are shown in FIG. 11.

The synthesis of chromophores with structure Ib follows the same procedures used for the synthesis of the chromophores with structure Ic, except that fused double ring-locked enone is used as one of the starting materials.

Figure 2:
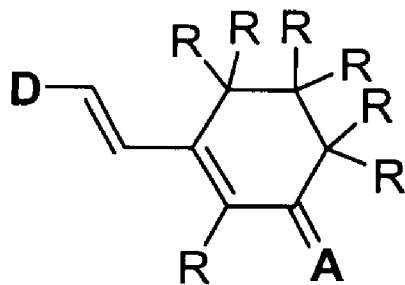
FIG. 2 illustrates the basic structure of class II chromophores according to the present invention.
Figure 2:
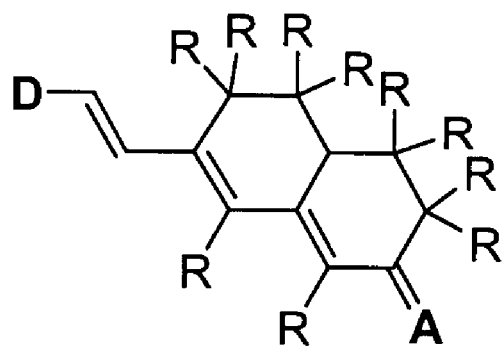
Figure 2:
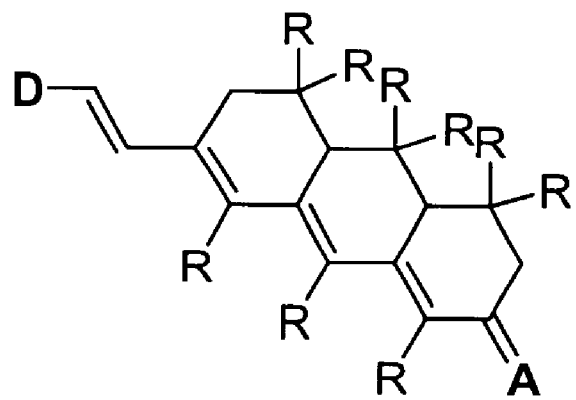
Figure 12:
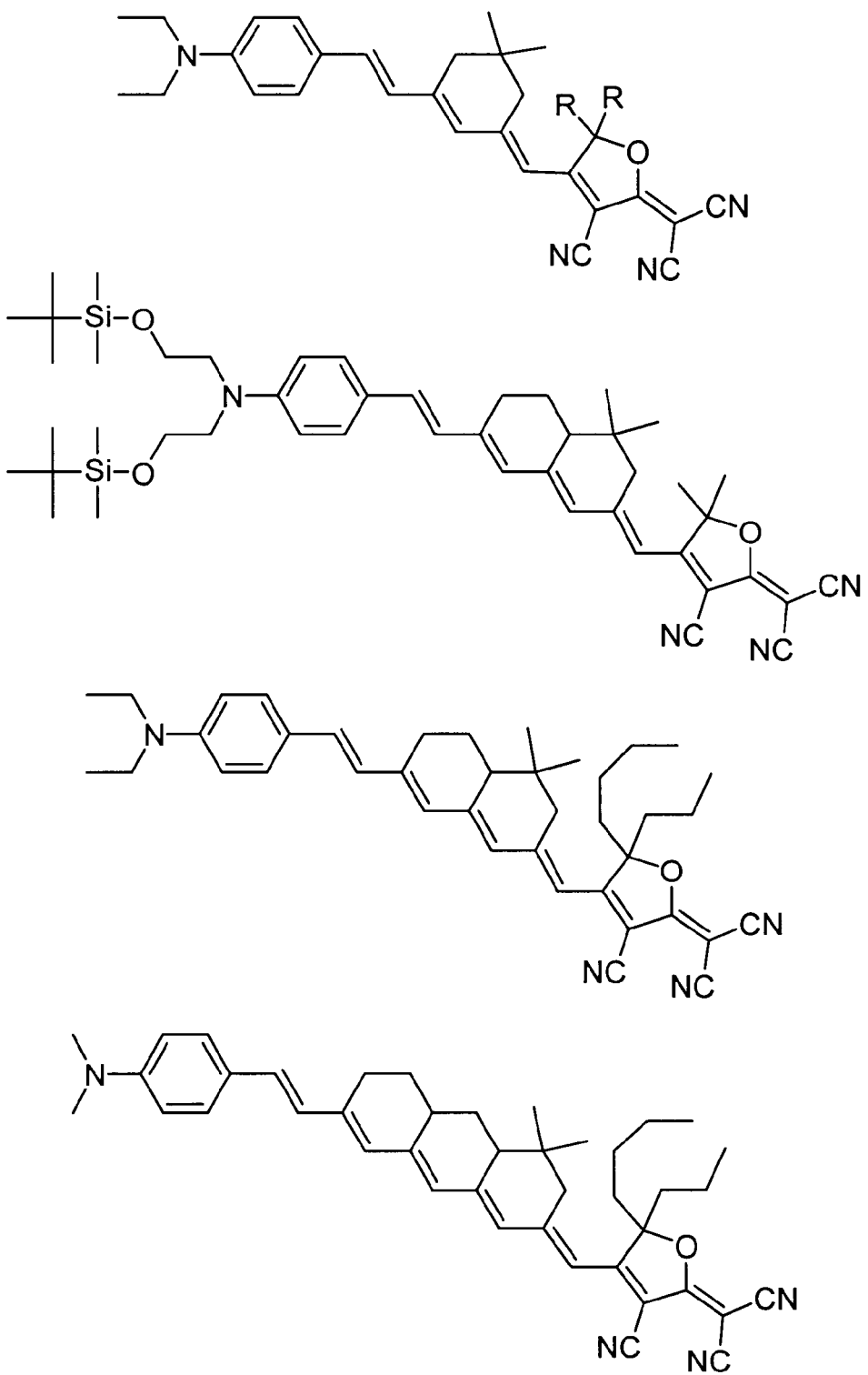
FIG. 12 illustrates some exemplary preferred chromophores having the basic structures depicted in FIG. 2.

Referring to FIG. 2, three chromophore structures (IIa, IIb, and IIc) according to the present invention are illustrated. Each chromophore includes an electron donor group ("D"), an electron acceptor group ("A") and a bridge structure therebetween. According to the present invention, these chromophores also have two free double bonds, with one free carbon-carbon double bond located between the donor D and the (fused) ring bridge and one unlocked double bond between the (fused) ring bridge and the electron acceptor. Various electron donors can be used, including, but not limited to, aminobenzenes, aminothiophenes, and ketene aminals (shown in FIG. 6). The electron acceptors can be any electron acceptor bearing an acidic methyl or methylene group, including, but not limited to, the acceptors shown in FIGS. 5, 7 and 8 (excluding 3-phenyl-5-isoazolone, thiobarbituric acid). In structures IIa, IIb, and IIc, R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy. The R groups at different positions are not necessarily the same. Exemplary preferred structures of class II chromophores are shown in FIG. 12.

Exemplary Synthesis of Chromophores of Structure IIb.

Figure 13:
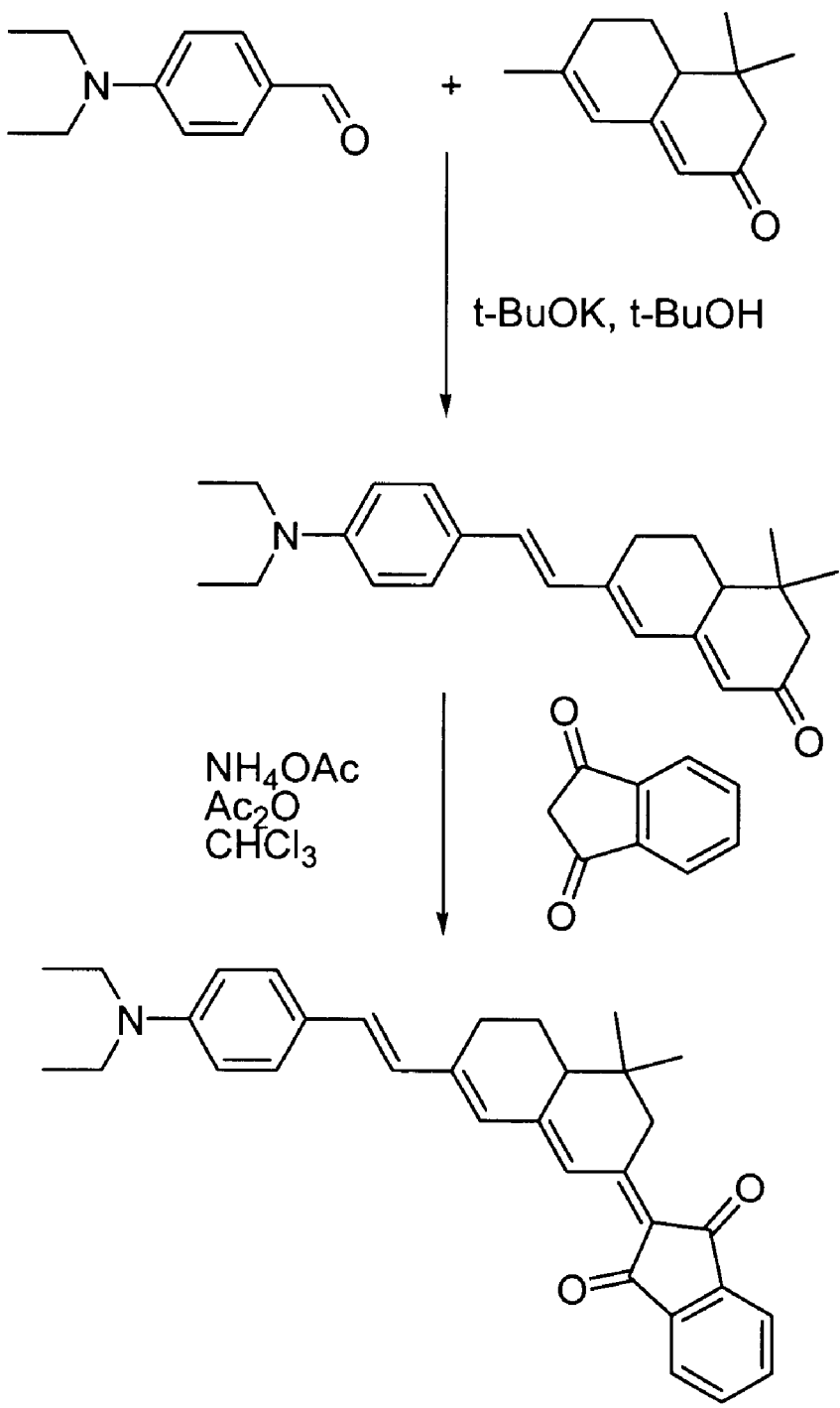
FIG. 13 illustrates an exemplary synthesis of the chromophore of structure (IIb) shown in FIG. 2.

An exemplary synthesis of class IIb chromophores is shown in FIG. 13. The reaction conditions are described in Chem. Mater. 1999, 11, 1628–1632.

Figure 3:
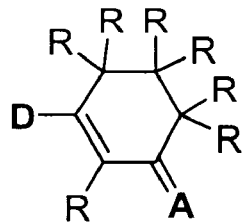
FIG. 3 illustrates the basic structure of class III chromophores according to the present invention.
Figure 3:
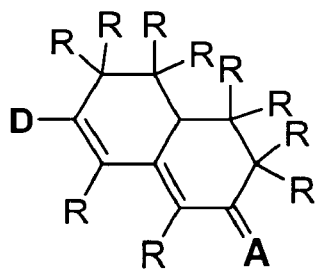
Figure 3:
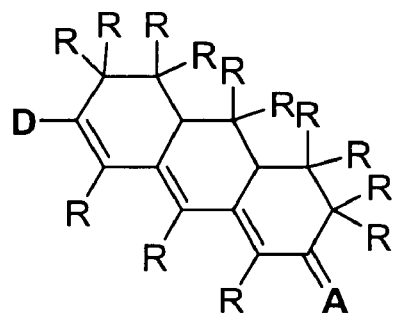
Figure 3:
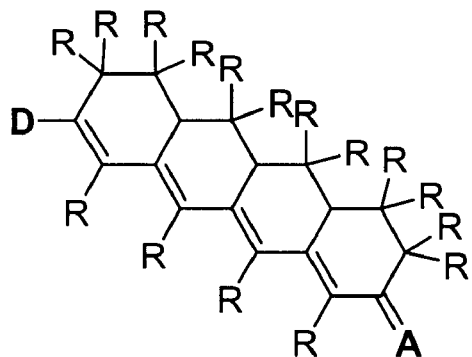
Figure 14:
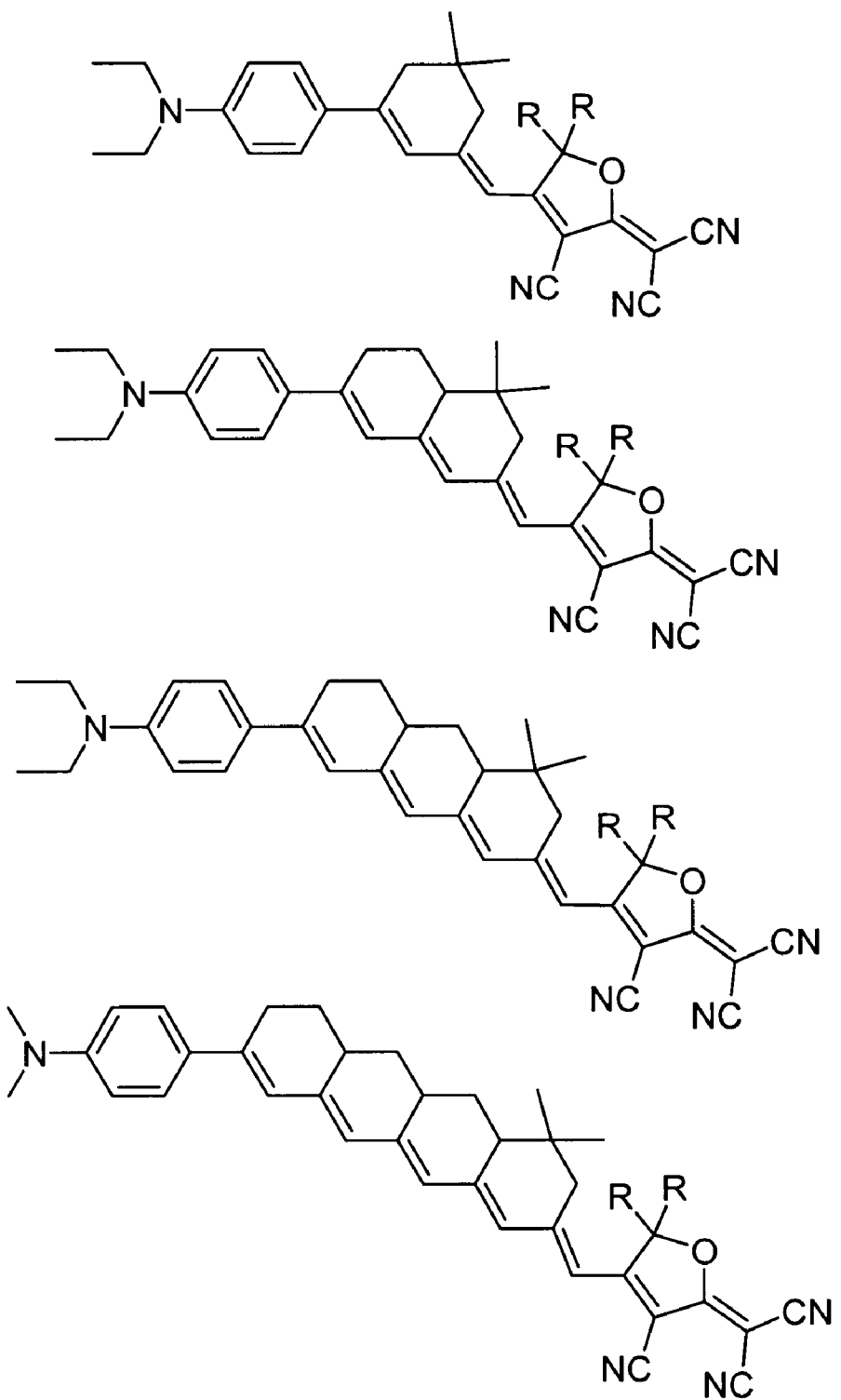
FIG. 14 illustrates some exemplary preferred chromophores having the basic structures depicted in FIG. 3.

Referring to FIG. 3, four chromophore structures (IIIa, IIIb, IIIc, and IIId) according to the present invention are illustrated. Each chromophore includes an electron donor group ("D"), an electron acceptor group ("A") and a bridge structure therebetween. According to the present invention, these chromophores have no carbon-carbon double bond between the donor and the (fused) ring bridge, rather the donor is directly connected to the (fused) ring bridge through a carbon-carbon single bond. There is only one (unlocked) carbon-carbon double bond that can undergo trans-cis isomerization between the (fused) ring bridge and the acceptor. Various electron donors can be used, including, but not limited to, aminobenzenes, aminothiophenes, and ketene aminals (shown in FIG. 6). The electron acceptors can be any electron acceptor bearing an acidic methyl or methylene group, including, but not limited to, the acceptors shown in FIGS. 5, 7 and 8. In structures IIIa, IIIb, IIIc, and IIId, R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy. The R groups at different positions are not necessarily the same. Exemplary preferred structures of class III chromophores are shown in FIG. 14

Figure 15:
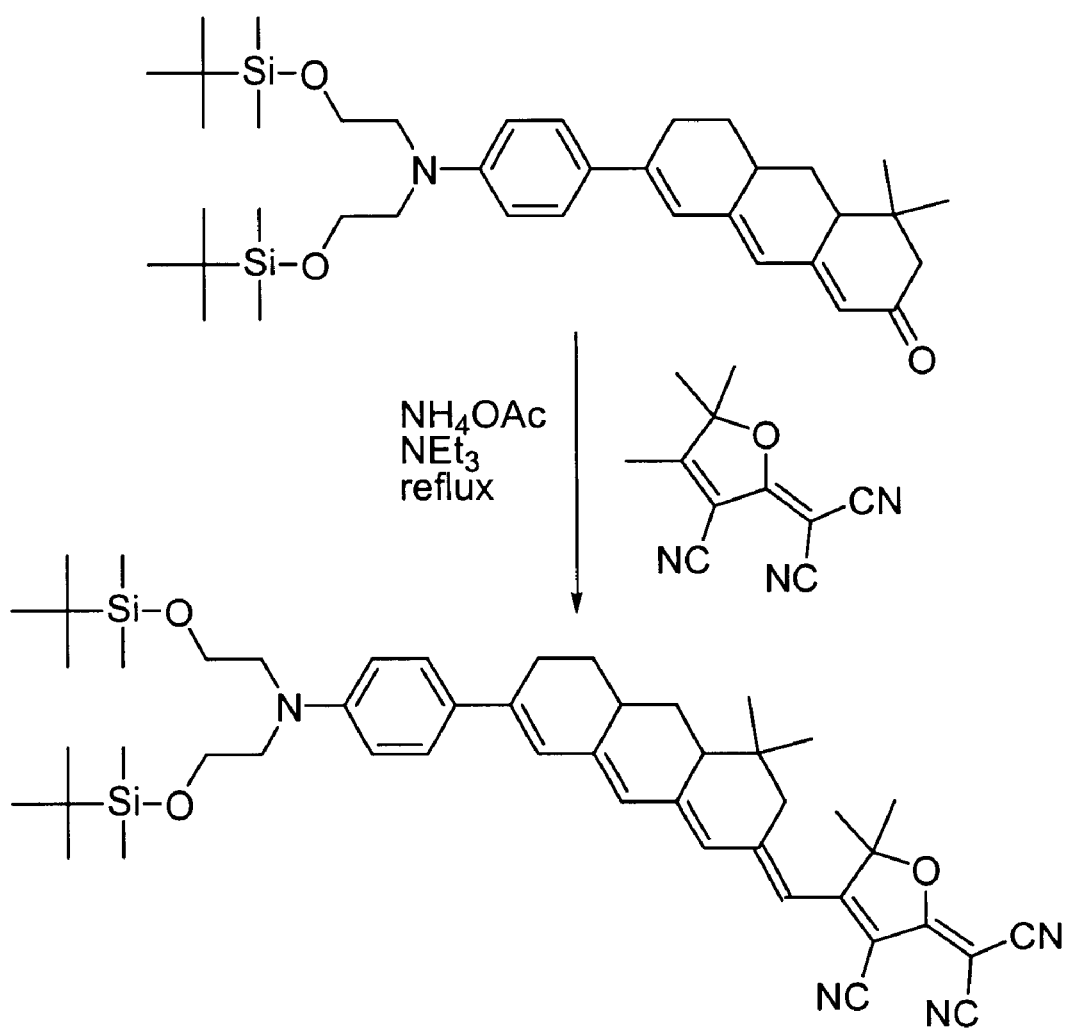
FIG. 15 illustrates an exemplary synthesis of the chromophores shown in FIG. 3.

Referring to FIG. 15, an exemplary preferred synthesis of a class III chromophore is shown. The starting material is synthesized according to FIG. 10. The Knovenagel coupling of the TCF acceptor with the donor bridge ketone using $NH_4Ac$ as catalyst and triethylamine as base and solvent afford the chromophore in 5% yield.

Figure 4:
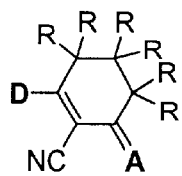
FIG. 4 illustrates the basic structure of class IV chromophores according to the present invention.
Figure 4:
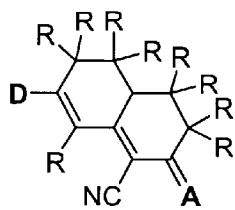
Figure 4:
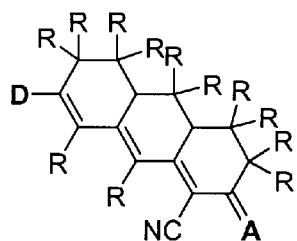
Figure 4:
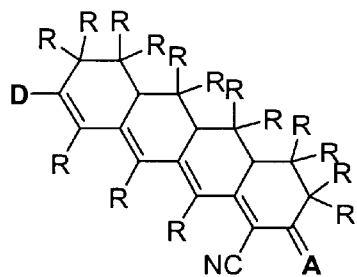
Figure 4:
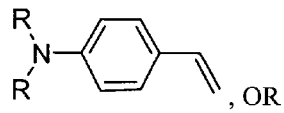
Figure 4:
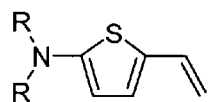
Figure 16:
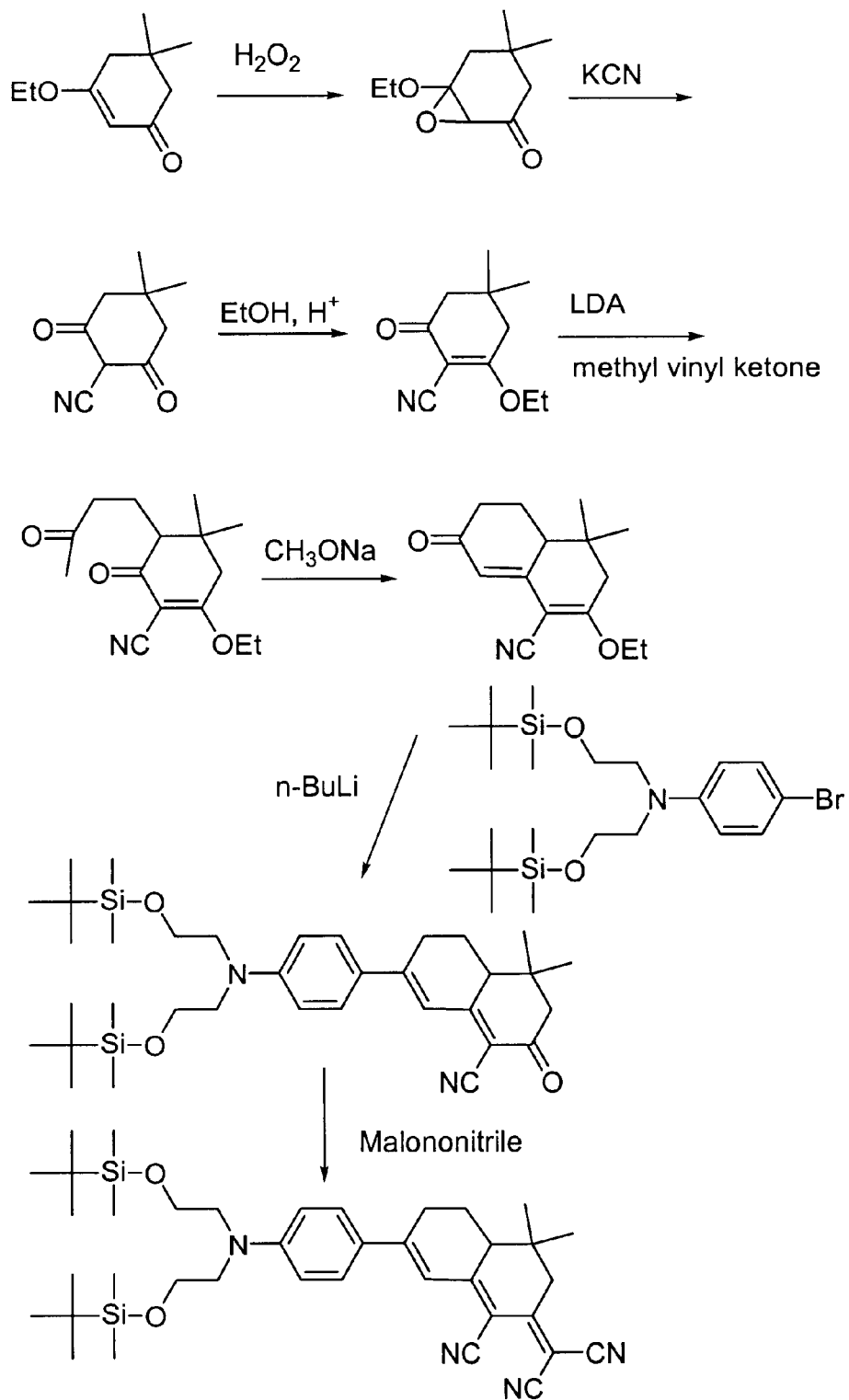
FIG. 16 illustrates an exemplary preferred synthetic scheme of chromophores shown in FIG. 4.

Referring to FIG. 4, four chromophore structures (IVa, IVb, IVc, and IVd) according to the present invention are illustrated. Each chromophore includes an electron donor group ("D"), an electron acceptor group ("A") and a bridge structure therebetween. According to the present invention, these chromophore have zero or one unlocked double bond that can undergo trans-cis isomerization, and they have a built-in electron-withdrawing cyano group on the last ring of the (fused) ring bridge. The chromophores are derivatized from a unique cyano-modified bridge system. The electron-withdrawing cyano group together with an additional electron-acceptor "A" provide strong electron-withdrawing ability even when a weak acceptor is used as "A". The donor is directly connected to the (fused) ring bridge through a carbon-carbon single bond. The use of dicyanovinylidene as "A" gives rise to a very unique chromophore: the first aminophenylpolyene-based chromophore that contains no trans-cis isomerization, yet still has strong electron-withdrawing group in the structure. The additional electron acceptor can be any electron acceptor bearing an acidic methyl or methylene group, including, but not limited to, the acceptors shown in FIGS. 5, 7 and 8. In structures IVa, IVb, IVc, and IVd, R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy. The R groups at different positions are not necessarily the same. An exemplary preferred synthetic scheme for the class IV chromophores is shown in FIG. 16.

Figure 5:
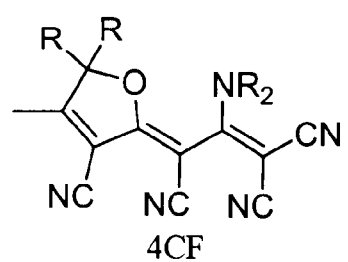
FIG. 5 illustrates the basic structure of new electron acceptors 4CF and 4CI.
Figure 5:
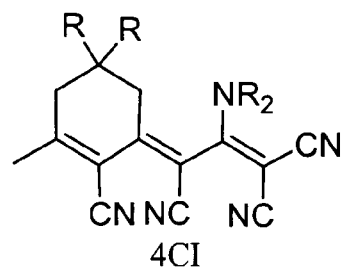

Referring to FIG. 5, compounds 4CF and 4CI are new tetracyano electron acceptors structurally derivatized from acceptors TCF and TCI, respectively, which are disclosed in U.S. patent application Ser. No. 09/488,422. The tetracyano electron acceptor groups pull electrons in approximately one direction, and thus produce a much larger dipole moment than the traditional tetracyano (BDMI) chromophores dipole moments which are typically around 6.5 debye.

Figure 20:
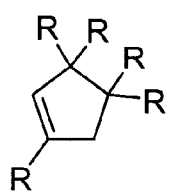
FIG. 20 illustrates a five-membered ring which, according to the present invention, can replace one or more of the six-membered rings in the bridges of the chromophores shown in FIGS. 1–5.
Figure 21:
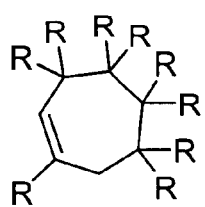
FIG. 21 illustrates a seven-membered ring which, according to the present invention, can replace one or more of the six-membered rings in the bridges of the chromophores shown in FIGS. 1–5.

It should be appreciated that the principles of the present invention are also applicable to chromophores where one or more of the six-membered rings in the bridges are replaced with five-membered rings (FIG. 20), seven-membered rings (FIG. 21), or rings with greater numbers of members.

Figure 17:
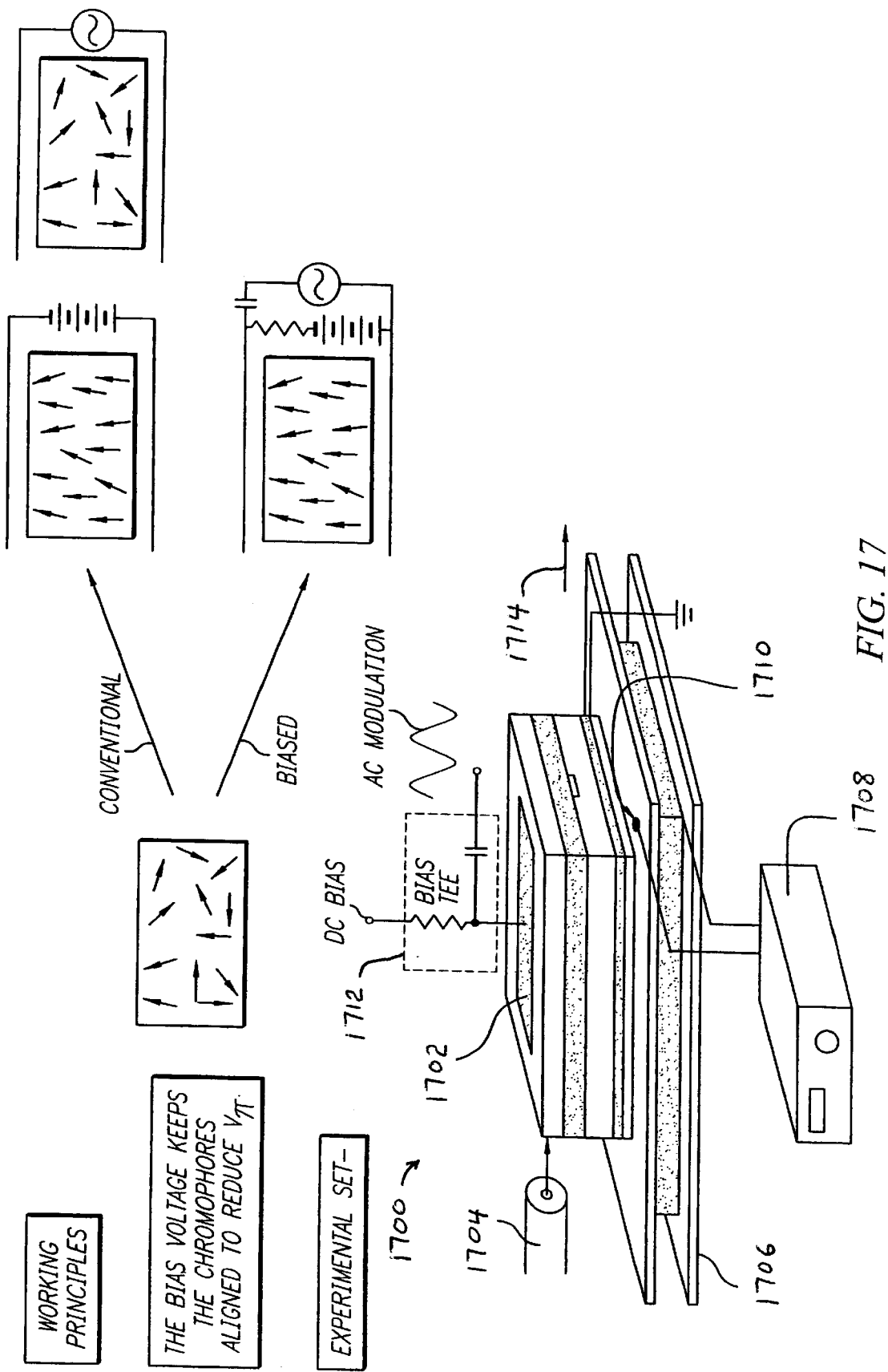
FIG. 17 illustrates an exemplary preferred electrooptic device employing a constant electric field bias, the device incorporating a chromophore material the present invention.

Referring to FIG. 17, an exemplary preferred electrooptic device 1700 employing a constant electric field bias is illustrated. The illustrated electrooptic device 1700 includes a modulator chip 1702, a fiber 1704, a thermoelectric cooler 1706, a temperature controller 1708, a thermister 1710, and a bias tee 1712 (including a resistor and a capacitor) configured as shown providing a light output indicated by arrow 1714.

Figure 18:
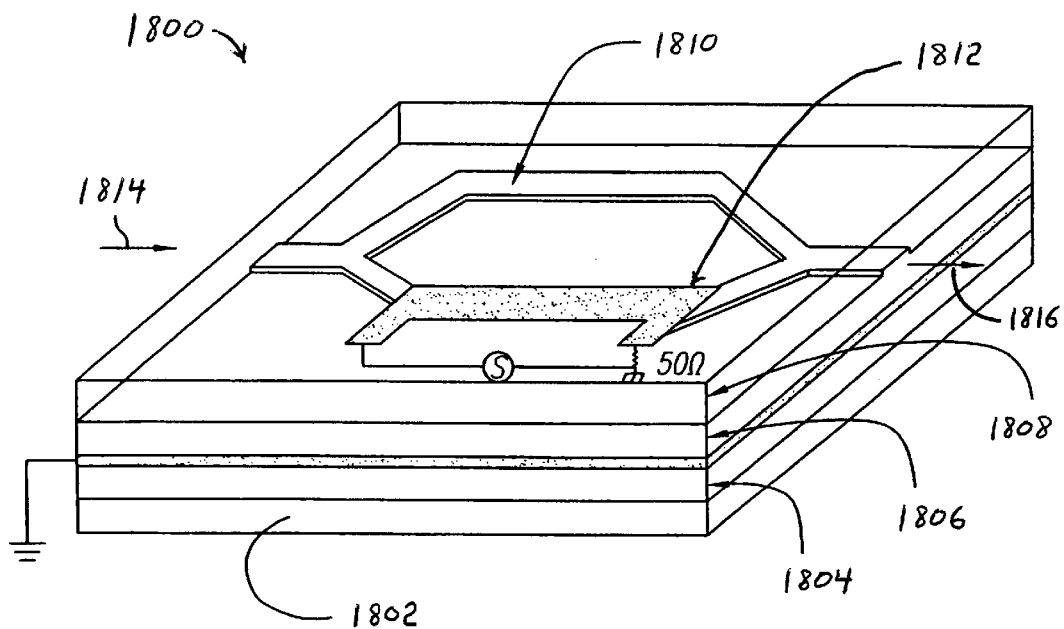
FIG. 18 illustrates an exemplary preferred Mach Zehnder modulator incorporating a chromophore material of the present invention.

Referring to FIG. 18, an exemplary preferred Mach Zehnder modulator 1800 incorporating a chromophore material of the present invention is illustrated. The illustrated modulator 1800 includes a Si substrate 1802, an Epoxylite (3 μm) layer 1804, a PU-chromophore (1.5 μm) layer 1806, a NOA73 (3.5 μm) layer 1808, a waveguide 1810 and an electrode 1812 configured as shown with light indicated by arrows 1814, 1816.

Figure 19:
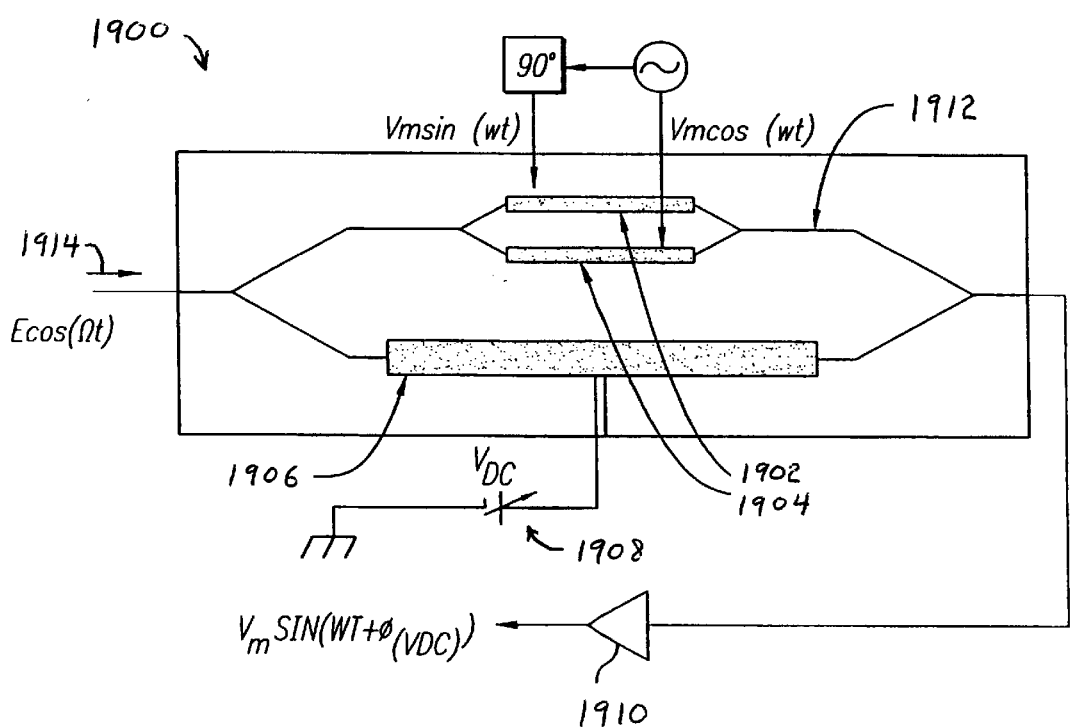
FIG. 19 illustrates the use of a chromophore material of the present invention (in the form of microstrip lines) in a microwave phase shifter of the type employed in optically controlled phased array radars.

Referring to FIG. 19, the materials of the present invention are shown in the form of microstrip lines in an exemplary preferred microwave phase shifter 1900 of the type employed in optically controlled phase array radars. The illustrated microwave phase shifter 1900 includes microstrip lines 1902, 1904, a DC control electrode 1906, a DC source 1908, a photodetector 1910 and an optical waveguide 1912 configured as shown with light indicated by arrow 1914.

Figure 22:
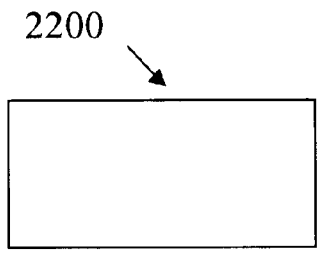
FIG. 22 illustrates a container within which an electrooptic device is hermetically packaged according to the present invention.

FIG. 22 shows a container 2200 within which an electrooptic device is hermetically packaged according to the present invention. More specifically, oxygen is removed from the container 2200 (e.g., a metal casing). In an exemplary preferred embodiment, an organic electrooptic device (e.g., a polymeric device) is hermetically packaged in a container filled with an inert gas including one or more of nitrogen, neon and argon.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

We claim:

1. A nonlinear optical device comprising:

an active element including a chromophore formed as:

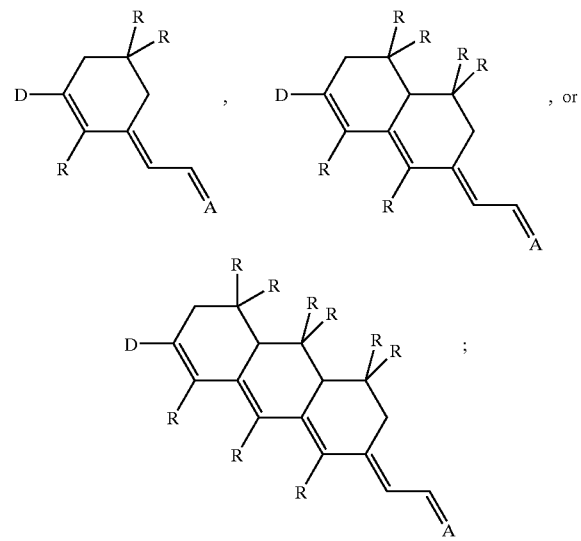

wherein D is an electron donor group;
wherein A is an electron acceptor group;
wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

2. The nonlinear optical device of claim 1 wherein the electron acceptor group is formed as:

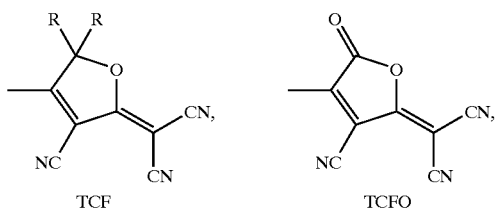

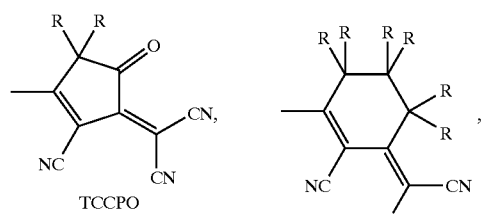

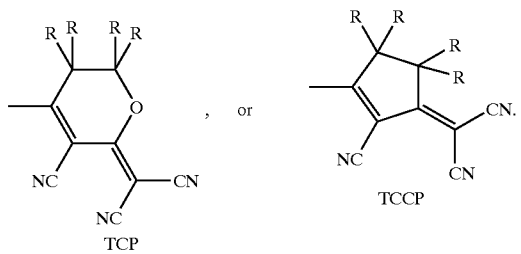

3. The nonlinear optical device of claim 1 wherein the electron acceptor group is formed as:

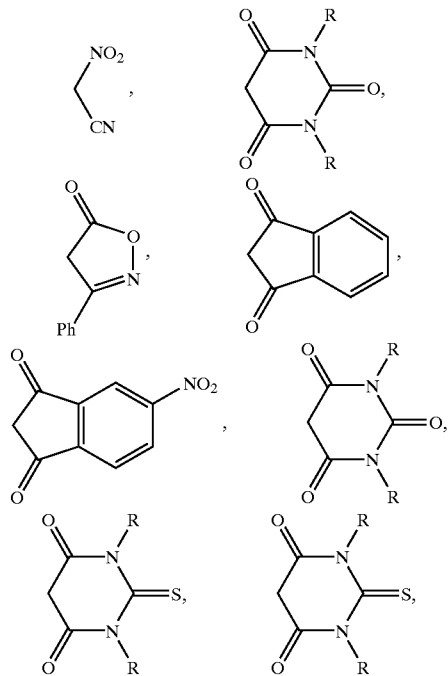

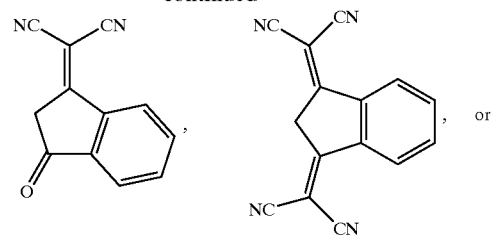

4. A nonlinear optical device comprising:
an active element formed from a chromophore including
an electron donor group,
an electron acceptor group, and
a π-conjugate aliphatic fused-ring bridge structure between the electron donor group and the electron acceptor group;
wherein the electron donor group is directly connected to the bridge structure, with no carbon-carbon double bond between the electron donor group and the bridge structure;
wherein the electron acceptor group is connected to the fused ring of the bridge structure with a conjugated diene.

5. The nonlinear optical device of claim 4 wherein the bridge structure includes one or more five-membered rings.

6. The nonlinear optical device of claim 4 wherein the bridge structure includes one or more six-membered rings.

7. The nonlinear optical device of claim 4 wherein the bridge structure includes one or more seven-membered rings.

8. A nonlinear optical device comprising:
an active element including a chromophore formed as:

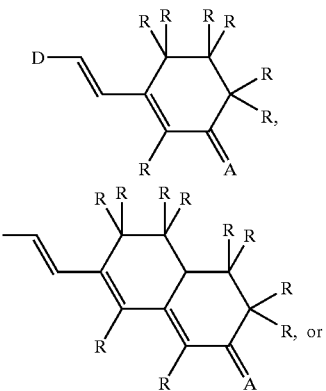

-continued

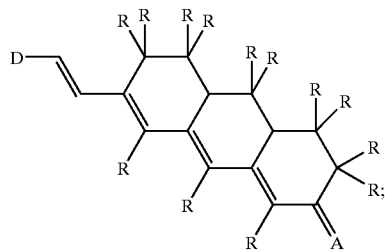

wherein D is an electron donor group;
wherein A is an electron acceptor group formed as:

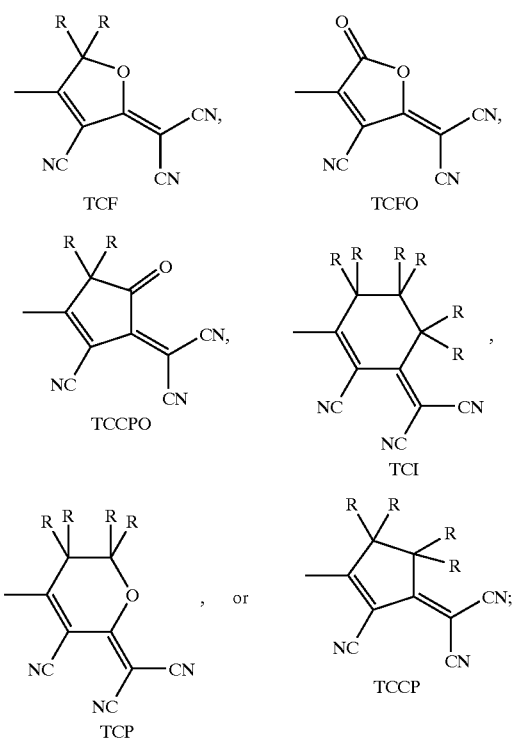

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

9. A nonlinear optical device comprising:

an active element including a chromophore formed as:

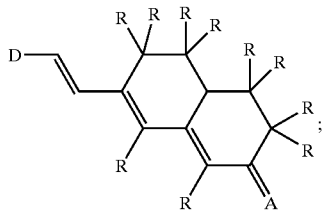

wherein D is an electron donor group;

wherein A is an electron acceptor group formed as:

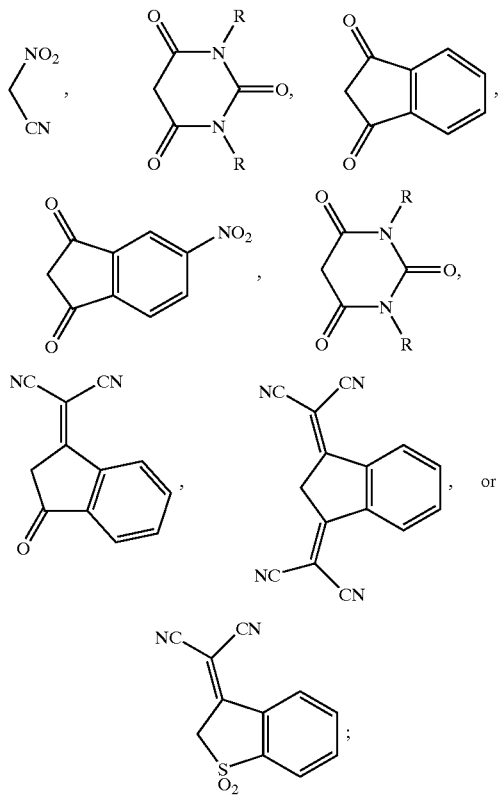

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

10. A nonlinear optical device comprising:

an active element including a chromophore formed as:

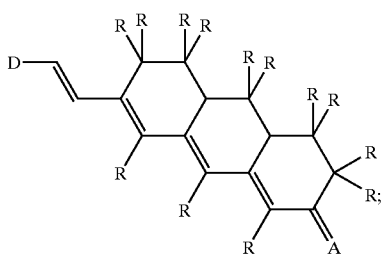

wherein D is an electron donor group;
wherein A is an electron acceptor group formed as:

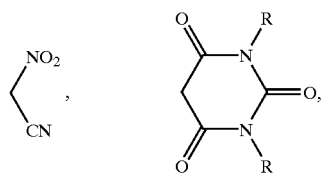

-continued

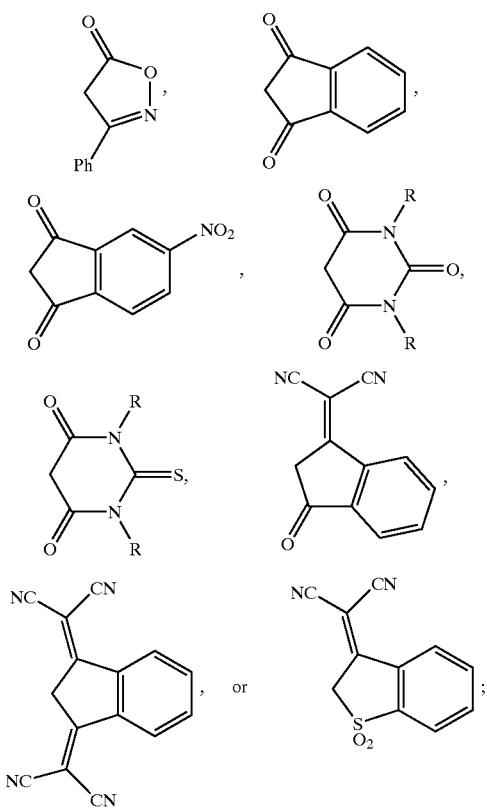

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

11. The nonlinear optical device of claim 8, 9, or 10 wherein one or more of the six-membered rings in the chromophore is/are replaced by one or more five-membered or seven-membered aliphatic rings.

12. A nonlinear optical device comprising:

an active element including a chromophore formed as:

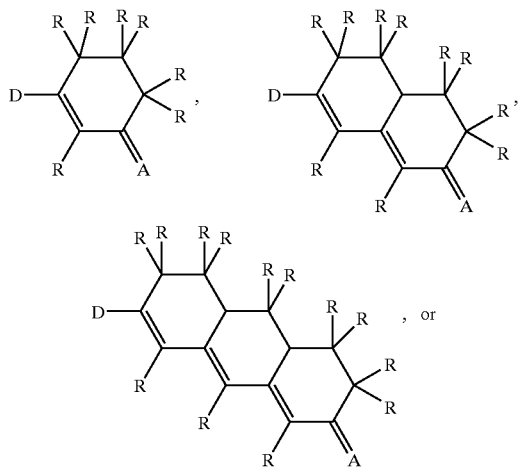

-continued

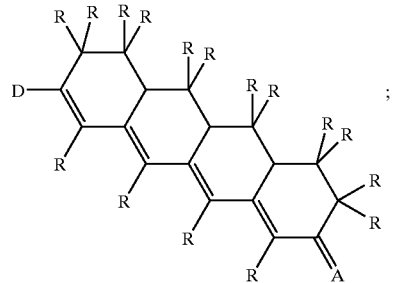

wherein D is an electron donor group;

wherein A is a ring-locked tricyano electron acceptor group;

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

13. The nonlinear optical device of claim 12 wherein the ring-locked tricyano electron acceptor is formed as:

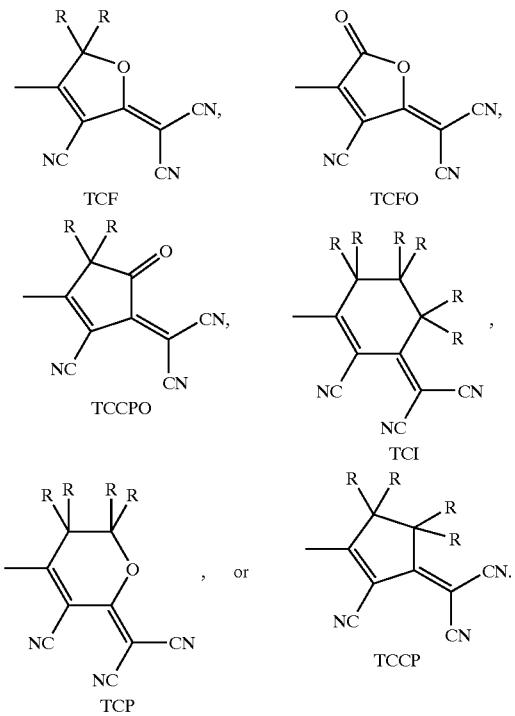

14. A nonlinear optical device comprising:

an active element including a chromophore formed as:

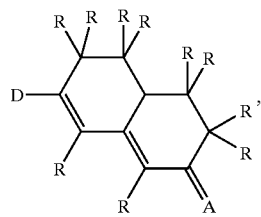

-continued

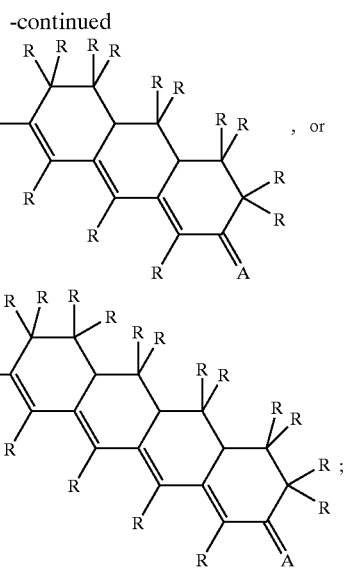

wherein D is an electron donor group;
wherein A is an electron acceptor group formed as:

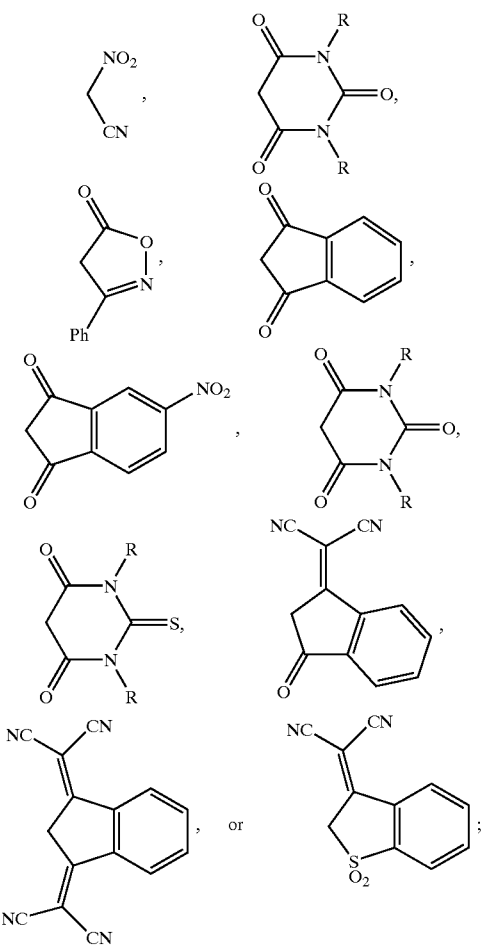

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

15. A nonlinear optical device comprising:
an active element including a chromophore formed as:

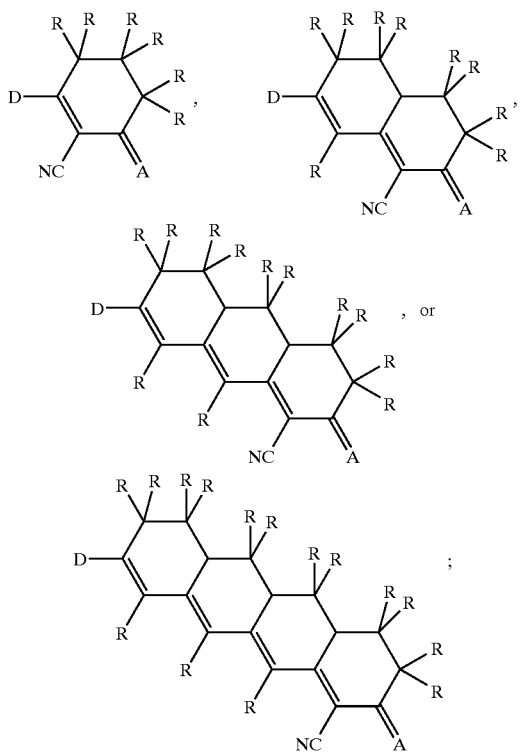

wherein D is an electron donor group;
wherein A is an electron acceptor group;
wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

16. The nonlinear optical device of claim 15 wherein the electron donor group is formed as:

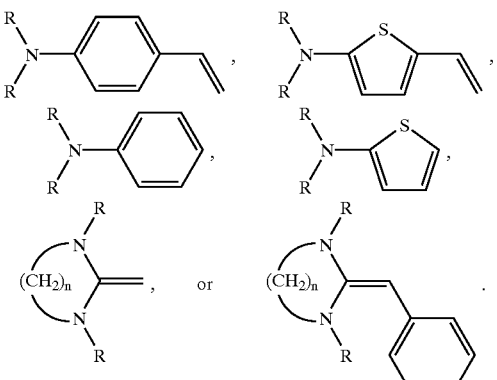

17. A nonlinear optical device comprising:
an active element formed from a chromophore including
an electron donor group,
an electron acceptor group, and
a bridge structure between the electron donor group and the electron acceptor group, the bridge structure including a ring double-bonded to the electron acceptor group, the ring including an electron withdrawing group.

18. The nonlinear optical device of claim 17 wherein the electron withdrawing group is a cyano group.

19. The nonlinear optical device of claim 17 wherein the bridge structure includes a five-membered ring.

20. The nonlinear optical device of claim 17 wherein the bridge structure includes a six-membered ring.

21. The nonlinear optical device of claim 17 wherein the bridge structure includes a seven-membered ring.

22. A nonlinear optical device comprising:

an active element including a chromophore formed as:

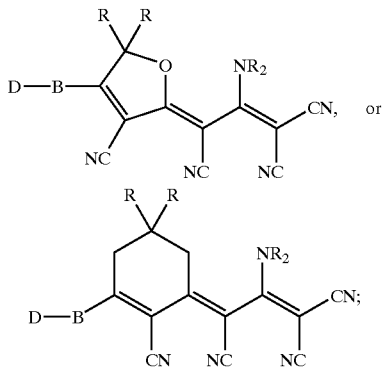

wherein D is an electron donor group;
wherein B is a n-conjugate bridge;
wherein A is an electron acceptor group;

wherein R=H, F, or any perhalogenated, halogenated or non-halogenated aliphatic or aromatic group with 1–30 carbon atoms functionalized with zero or more of the following functional groups: hydroxy, ether, ester, amino, silyl, and siloxy, and R groups at different positions are not necessarily the same.

23. A nonlinear optical device comprising:

an active element formed from a chromophore including an electron donor group,
an electron acceptor group including a linear conjugated triene bearing four cyano groups, and
a bridge structure between the electron donor group and the electron acceptor group;
wherein the linear conjugated triene is a linear extension of the conjugated system of the donor and the bridge.

24. The nonlinear optical device of any of claims 1–10 and 12–23 wherein the device is hermetically packaged in a container either vacuumed or vacuumed and then filled with an inert gas including one or more of: nitrogen, helium, neon, argon, krypton and xenon.

25. The nonlinear optical device of claim 24 wherein the container is a metal case.

26. An optical device comprising:

a nonlinear optical device having a nonlinear optical material which is polymeric, the nonlinear optical device being hermetically packaged in a container filled with an inert gas including one or more of nitrogen, neon and argon.

* * * * *